(12) United States Patent
Williams

(10) Patent No.: US 6,386,360 B1
(45) Date of Patent: May 14, 2002

(54) FAST FILE MEDIA STORAGE

(76) Inventor: F. Baker Williams, 5263 Batavia Rd., South Gate, Los Angeles County, CA (US) 90280

( * ) Notice: Subject to any disclaimer, the term of this patent is extended or adjusted under 35 U.S.C. 154(b) by 0 days.

(21) Appl. No.: 09/709,476

(22) Filed: Nov. 13, 2000

Related U.S. Application Data

(63) Continuation-in-part of application No. 09/408,269, filed on Sep. 29, 1999, now abandoned
(60) Provisional application No. 60/102,477, filed on Sep. 30, 1998.

(51) Int. Cl.$^7$ .............................................. B65D 85/97
(52) U.S. Cl. ..................................... 206/308.1; 206/312
(58) Field of Search .............................. 206/308.1, 309, 206/310, 311, 312, 313; 229/72, 75

(56) References Cited

U.S. PATENT DOCUMENTS

| | | | | | |
|---|---|---|---|---|---|
| 4,221,161 A | * | 9/1980 | Hurt | ............................ | 229/75 |
| 4,382,539 A | * | 5/1983 | Kronman | ..................... | 229/75 |
| 4,473,153 A | * | 9/1984 | Colangelo | .................... | 206/312 |
| 4,871,066 A | * | 10/1989 | LaWall | ........................ | 206/425 |
| 5,048,681 A | * | 9/1991 | Henkel | ........................ | 206/312 |
| D332,005 S | * | 12/1992 | Walasek | ...................... | 206/309 |
| 5,263,581 A | * | 11/1993 | Rosen | ......................... | 206/313 |
| 5,472,083 A | * | 12/1995 | Robinson | ................. | 206/308.1 |
| 5,501,326 A | * | 3/1996 | Shuhsiang | ............... | 206/307.1 |
| 5,509,533 A | * | 4/1996 | Veenstra | ..................... | 206/425 |
| 5,588,527 A | * | 12/1996 | Youngs | .................... | 206/308.1 |
| 5,692,607 A | * | 12/1997 | Brosmith et al. | ........ | 206/308.1 |
| 5,823,333 A | * | 10/1998 | Mori | ....................... | 206/308.1 |

* cited by examiner

*Primary Examiner*—Shian Luong
(74) *Attorney, Agent, or Firm*—Lacasse & Associates; Randy W. Lacasse

(57) ABSTRACT

A thin transparent envelope is used to hold compact discs, case liners and liner notes. The envelope is thinner than a traditional jewel case to allow denser storage of multiple disks. An extended portion of the envelope securely holds the case liner and intact spine labels and allows a clear view of the spine label to allow for easy identification of the envelope's contents. In addition, the pocket portion of the envelope has side flaps and a shape which allow the pocket to easily accommodate insertion and removal of discs and literature.

6 Claims, 8 Drawing Sheets

FAST FILE MEDIA STORAGE

This application is a continuation-in-part of Ser. No. 09/408,269 filed Sep. 29, 1999, now abandoned.

BACKGROUND OF THE INVENTION

1. Field of Invention

The present application is based upon U.S. provisional application Ser. No. 60/102,477, filed on Sep. 30, 1998, entitled Fast File CD Storage. The present invention relates generally to the field of media storage devices. More specifically, the present invention is related to storing compact discs and their associated literature.

2. Discussion of Prior Art

Compact discs are traditionally shipped, stored and displayed in rigid plastic boxes often referred to as jewel cases or jewel boxes. Literature which accompanies the disc is held in the jewel case as well. Most commonly this literature takes the form of liner notes and a case liner that identify the contents of the case and provide additional information about the associated compact disc. Typically, a case liner has two ¼"end sections called "spine labels". These spine labels fold into the side edges of the jewel case to provide a terse identification of the case's contents.

While jewel cases adequately protect compact discs, they have serious drawbacks. Jewel cases break and damage easily and they are relatively expensive to manufacture. Further, some people have difficulty operating the locking hub mechanism to release a compact disc from its holder and these cases are much too thick to allow dense storage of compact discs and their literature.

One alternative to jewel cases is thin plastic envelopes which are usually held in rigid book-like or in soft zippered wallet-like cases. These envelopes address some of the shortcomings of jewel cases but have their own set of weaknesses. Often, these envelopes are very thin and make inserting and removing a compact disc very difficult, if not impossible. They are typically two sheets of plastic sealed around a number of edges that create a wedge shape that pinches the envelope contents during insertion and retrieval. Also, failure to hold both case liners and liner notes is one of the greatest drawbacks of envelope-type holders. Of the envelopes that do accommodate some type of literature, they often do not allow easy insertion and removal of the literature, they sometimes require mutilation of the literature to fit within the envelope, and they fail to fully display the literature to assist with the indexing and retrieving of compact discs. The prior art, as discussed below, has these, as well as other, differences from the current invention.

The patent to Colangelo U.S. Pat. No. 4,473,153 provides for a Flexible Disk Cartridge Envelope. A floppy disk holder is illustrated by this patent with an over-sized pocket. However, no discussion of compact discs, transparency or spine label visibility is provided.

The patent to Youngs U.S. Pat. No. 4,850,731 provides for a Compact Disc Storage Container Non-Scratching Surface. A sleeve is described which provides visible access to both a CD and accompanying graphic literature. However, display of an intact spine label as an indexing means is not discussed.

The patent to Mitsuyama U.S. Pat. No. 4,971,195 provides for a Disc Case. A transparent storage sleeve with a tab area and a holder for literature is described. Easily accommodating the spine label to provide a scannable index, however, is not described.

The patent to Henkel U.S. Pat. No. 5,048,681 provides for an Envelope Storage for Compact Discs. A transparent envelope CD storage system is described but involves shrink wrapping the media and fails to discuss storage of case liners and notes.

The patent to Youngs U.S. Pat. No. 5,462,160 provides for a Storage Container With Integral Flap. A transparent sleeve storage system for compact discs is described which uses the spine label for identification purposes. However, the spine label needs to be detached and is placed on the inside edge of the sleeve rather than an outside edge.

The patent to Oshry et al. U.S. Pat. No. 5,555,977, assigned to Roundhouse Products, Inc, provides for a Sleeve and Storage Device for Planar Articles. A general teaching of a clear-sleeve CD indexing and storage system is described. The sleeves, however, do not appear to hold anything except a CD.

The patent to Durr U.S. Pat. No. 5,662,217 provides for a Compact Disc Sleeve Package. A foldable CD sleeve is described which provides side tabs to make the pocket easier to use. However, the described sleeve is for mailing and does not discuss visibility of the media or the case liner.

The patent to Collins U.S. Pat. No. 5,769,216 provides for a Holder for Compact Disc and the Like. FIG. 8 of this patent illustrates a foldable CD sleeve, however, the sleeve is made from paper rather than a transparent material and makes no provision for the visibility of the contents within the sleeve.

The patent to Ho U.S. Pat. No. 5,833,063 provides for a Plastic Loose-Leaf Bag Capable of Storing a Compact Disk Therein. A foldable transparent envelope is described which holds a compact disc. A tab portion on the sleeve is also illustrated in FIG. 2 of this patent; however, no discussion of spine label or other literature visibility is provided.

The patent to Hartstone U.S. Pat. No. 5,884,764 provides for a Disc Storage Arrangement. Although directed to a CD storage system, a sleeve is described which forms two pockets, one for a CD and one for a booklet. While a region is provided for tab information, accommodating spine labels does not appear to be mentioned.

The patent to Neely U.S. Pat. No. 5,909,805 provides for a Label Assembly for Package Sleeve Accommodating a Storage Media Disc and Method for Sealing a Package Sleeve. A protective disk mailer is described which places textual information near the top edge of the mailer to aid with identification.

Whatever the precise merits, features and advantages of the above cited references, none of them achieves or fulfills the purposes of the present invention. They fail to provide for a compact disc storage envelope which protects the literature and the disc, allows for easy insertion and removal of the literature and disc, and displays an intact spine label to facilitate easy indexing and identification of envelope contents.

SUMMARY OF THE INVENTION

A thin transparent envelope is used to hold compact discs, DVDs, other electronic recording discs, case liners and liner notes. The envelope is thinner than a traditional jewel case to allow denser storage of multiple disks. An extended portion of the envelope securely holds the case liner and intact spine labels and allows a clear view of the spine label to allow for easy identification of the envelope's contents. In addition, two pockets are formed by side flaps folded over more than 180° by two or more closely-spaced folds in combination with said extended portion tucked therein. The space between the folds allows the pockets to easily accommodate separate insertion and removal of discs and literature. Typically, a number of the envelopes are encased in a card-catalogue storage device. This allows rapid identification and retrieval of compact discs by means of scrolling (thumbing through) the displayed spine labels. Alternatively, a number of the envelopes are bound together along their bottom edges and encased in a storage device which is opened to allow expansion of the binding. This exposes all of the displayed spine labels simultaneously and, therefore, allows even more rapid identification and retrieval by permitting scanning of all the displayed spine labels.

DESCRIPTION OF THE PREFERRED EMBODIMENTS

Figure 1A:
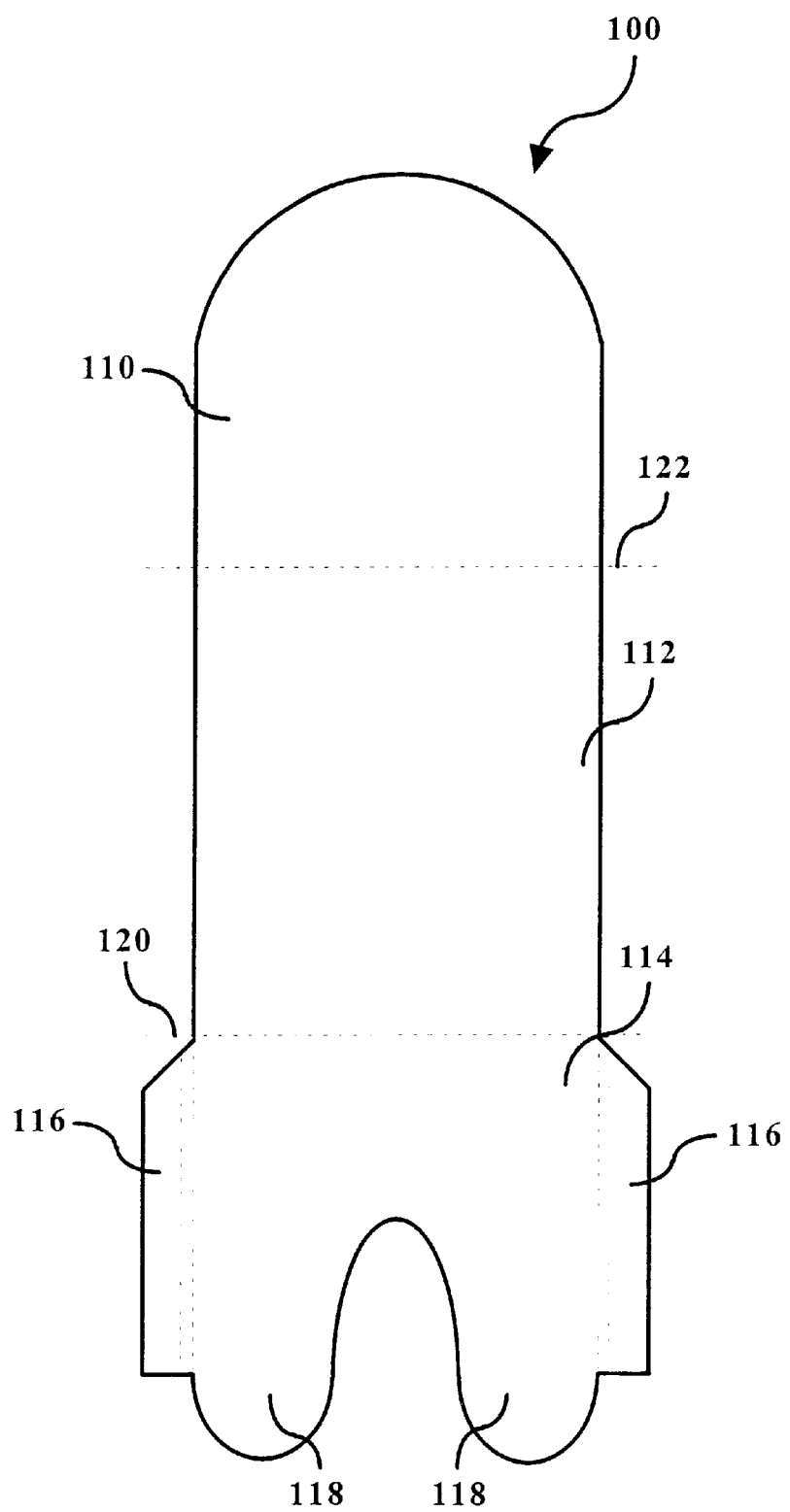
FIGS. 1a and 1b illustrate a front view unfolded and a folded depiction, respectively, of the envelope of the present invention.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

FIG. 1a illustrates an unfolded envelope of the present invention. The envelope is constructed of a transparent plastic material or film which affords both visibility and protection of the envelope contents. A preferred thickness, for this plastic material is approximately 0.005". While other functionally equivalent materials and a wide range of thicknesses are also considered to be within the scope of the present invention, this preferred thickness provides a good balance between rigidity and flexibility.

As depicted in FIG. 1a, the unfolded envelope has already been stamped or cut from a sheet of plastic into its general finished shape.

Region 112 forms the rear of envelope 100 when folded. While a preferred embodiment considers industry standard compact discs and literature, obvious dimensional modifications which allow application of the present invention's principles to other current media and even future industry standards are also considered within its scope. In the preferred embodiment, however, region 112 is approximately 4.75" wide and 5.75" long. These dimensions allow comfortable insertion of compact discs and literature into envelope 100 and removal therefrom.

Region 110 has a curved top edge and has approximately the same dimensions as region 112. Region 114 has the most complex shape of envelope 100 three regions. While the main portion of region 114 is approximately as wide as regions 110 and 112, its height is approximately the diameter of a compact disc (i.e., 4.75"). Two lobes 118 are present at the bottom edge of region 114. The inside edges, around the circumference, of these semi-circular lobes 118 meet approximately in the center of region 114 and assist with inserting contents into and removing contents from envelope 100 as fully explained below.

Two flaps 116 which extend from each side edge of region 114 are approximately 3/8 inches wide and approximately 4 inches long. While exact placement of flaps 116 is not critical, there are some constraints that must be met. First, they must be long enough to provide a secure connection between regions 114 and 112. Also, flaps 116 must not be too close to fold 120 or they will interfere with forming fold 120; and, they must not be too close to the tip of lobes 118 or they will prevent the lobes from easily bending open.

Figure 1B:
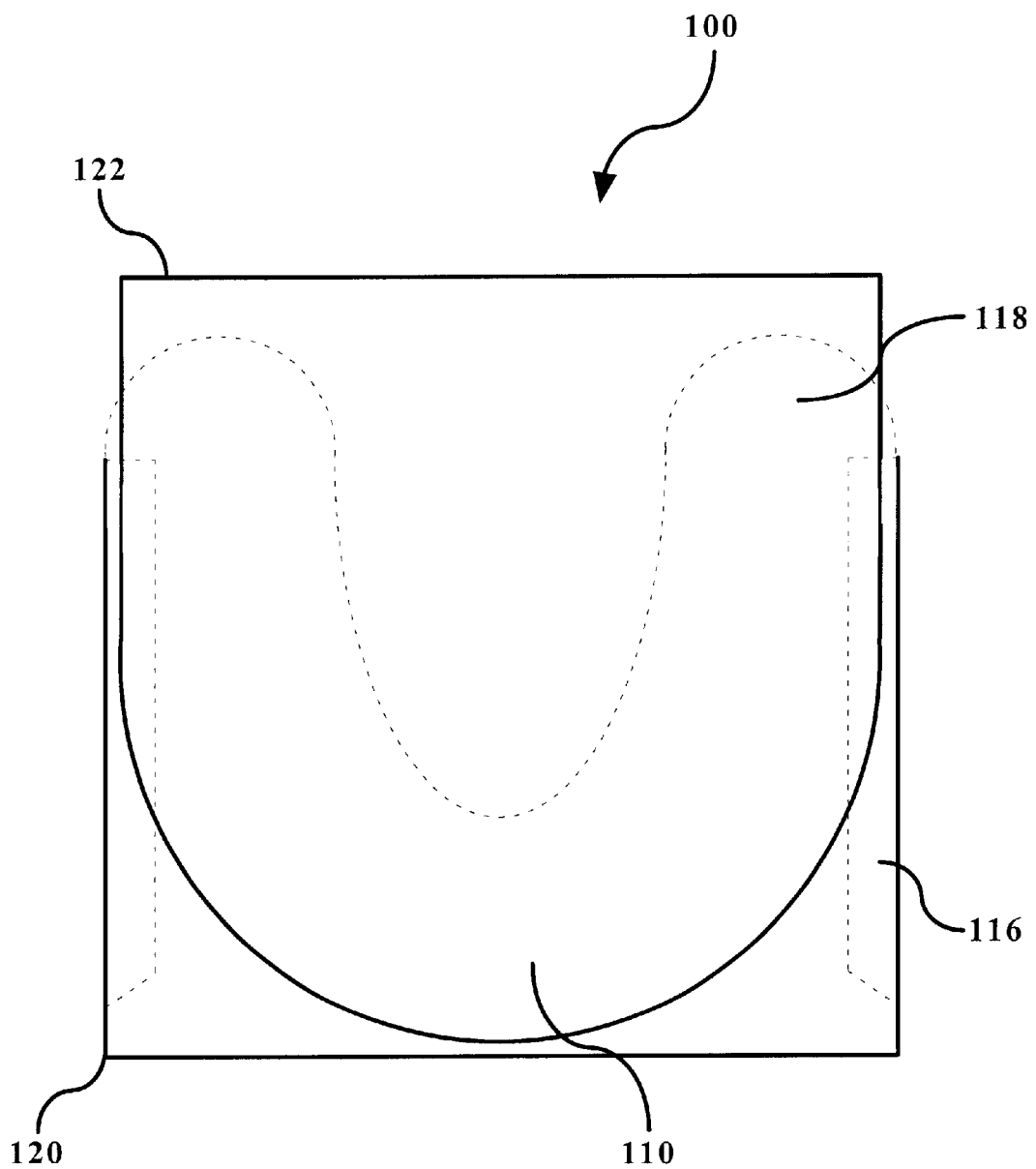

FIG. 1b depicts a folded envelope of the present invention with flaps 116 folded behind region 112. Region 110 is the closest surface to the viewer, region 114 is in the middle and region 112 is farthest from the viewer.

Figure 1C:
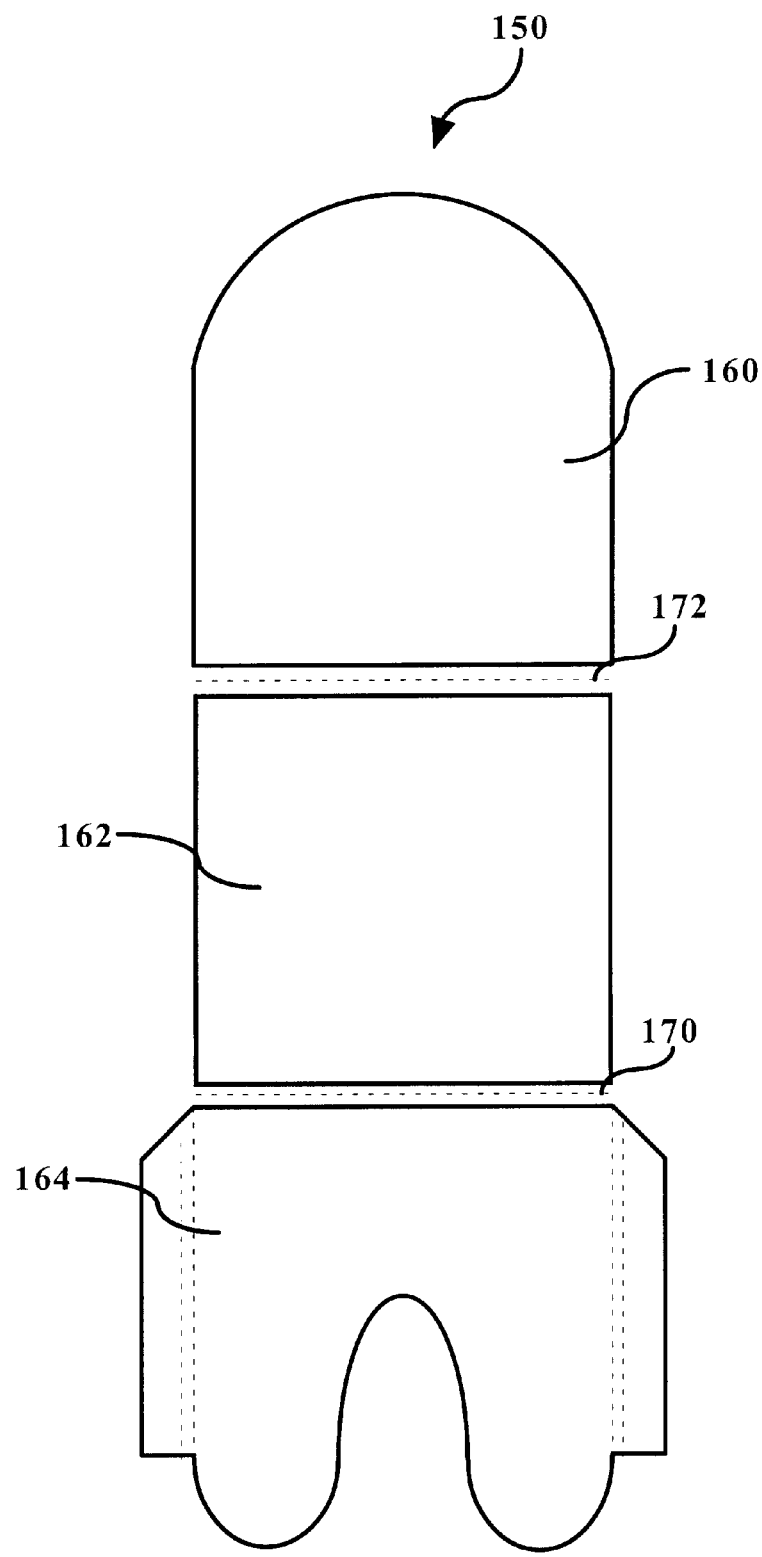
FIG. 1c illustrates an alternative construction method of the envelope of the present invention.

FIG. 1c depicts an alternate embodiment of the present invention in which regions 160, 162 and 164 are separate pieces of material which, when assembled, are functionally attached at their common joints 170 and 172.

Figure 1D:
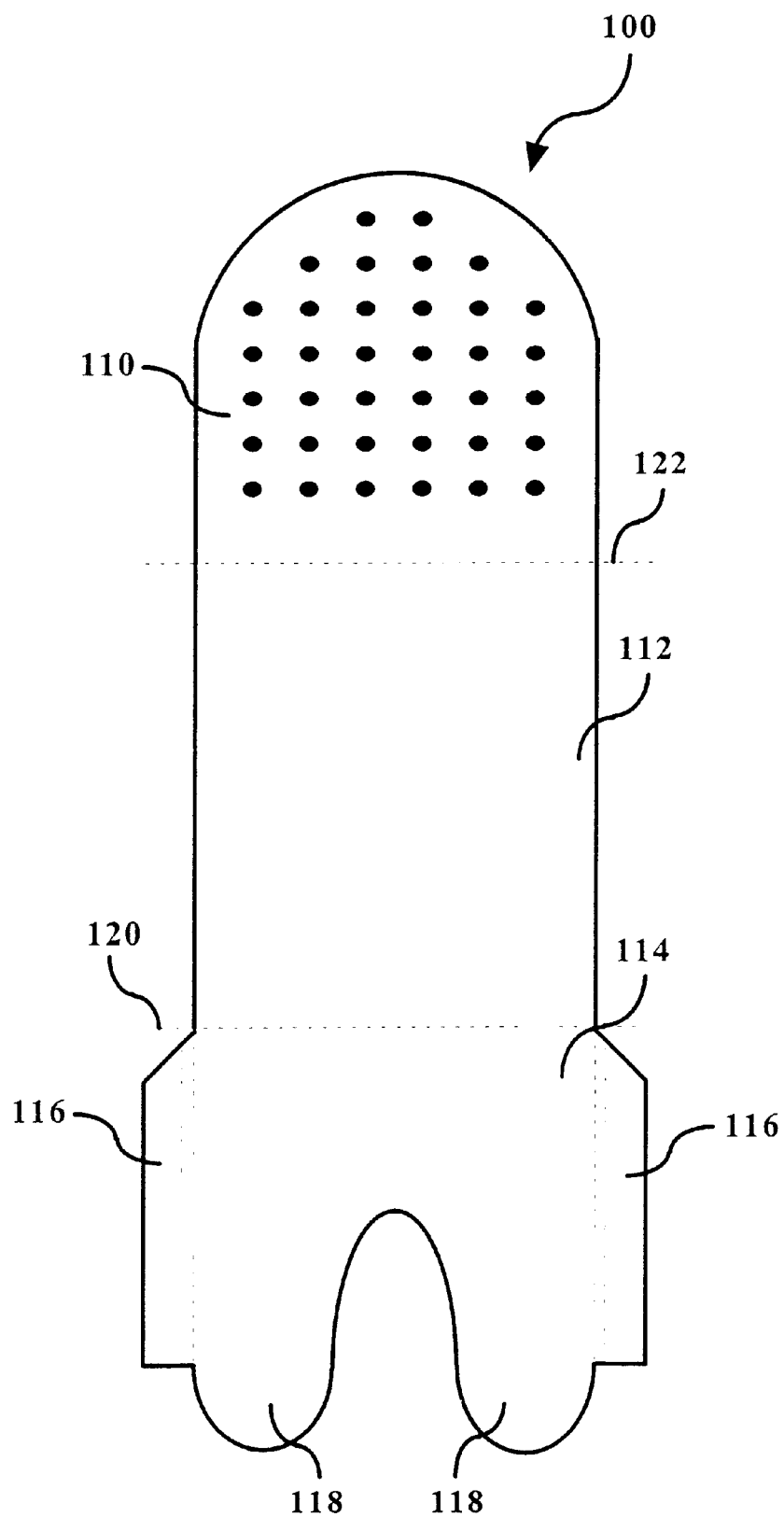
FIGS. 1d and 1e illustrate a rear view unfolded with protective surface modifications and a folded depiction thereof, respectively, of the envelope of the present invention.
Figure 1E:
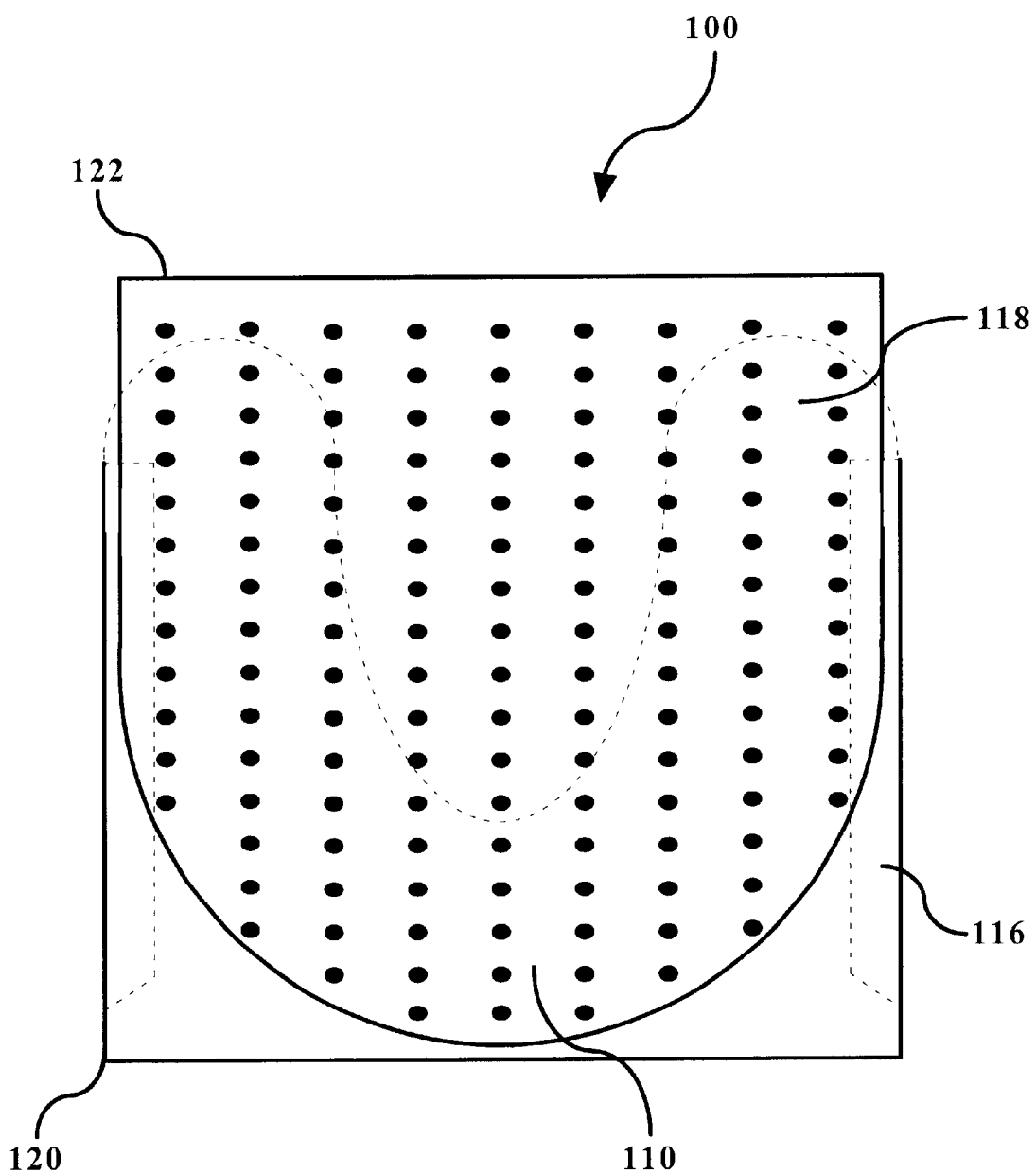

FIGS. 1d and 1e illustrate a rear view unfolded with protective surface modifications and a front view folded depiction thereof of the envelope of the present invention. In this embodiment, the rear side of region 110 further comprises a pattern of raised-rim holes, tiny raised pimples, or domes which provide for increased finger traction and a degree of protection for the recording media stored in the envelope.

Figure 2:
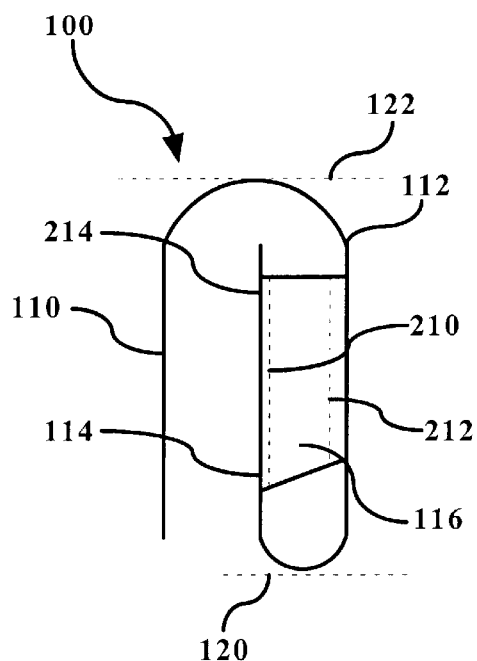
FIG. 2 illustrates a side view of the assembled envelope of the present invention.

FIG. 2 depicts a side view of folded envelope 100 which is empty of any contents. Region 114 is folded along line 120 and attached to region 112 using flaps 116. In a preferred embodiment, flaps 116 are bent more than 180° to secure regions 114 and 112 together. Flaps 116 extend from surface 114 and have a first crease 210 which bends the flaps towards region 112. Second crease 212 bends flaps 116 around the back of region 112 (as seen in figure 1b). Together, the two creases create a greater than 180° bend in flaps 116. The rigidity of flaps 116 and their ability to hold their shape when folded is sufficient to attach region 114 to region 112. Also considered within the scope of the present invention is the use of more than two creases to accomplish the bending of flaps 116.

This preferred method of attachment, however, does not preclude the use of adhesive or welding to secure flaps 116. Other functionally equivalent methods of sealing plastic and similar materials are also contemplated within the scope of the present invention.

Also depicted in FIG. 2 is portion 214 of region 114 which extends beyond flaps 116. Portion 214, are the parts of each lobe 118 that bend open when inserting discs and literature into envelope 100.

Figure 3A:
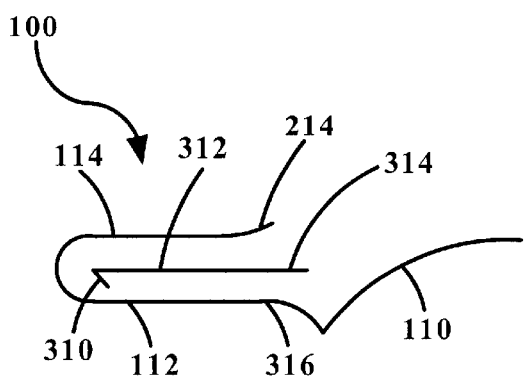
FIGS. 3a and 3b together illustrate a side view of literature inserted within the envelope of the present invention.

FIG. 3a depicts the present invention being loaded with case liner 312. Region 110 is bent open and relies on two features of envelope 100 to facilitate insertion of case liner 312. First, because flaps 116 (not shown in FIG. 3a) do not extend the entire length of region 112, region 110 bends near point 316. Secondly, portions 214 of lobes 118 (not shown in FIG. 3a) work in conjunction with the wide opening of region 110 to form almost a funnel shape into which case liner 312 is easily inserted.

Case liner 312 has spine labels 310 and 314 still attached when inserted into envelope 100. In a preferred embodiment, one spine label 310 is folded over and another spine label 314 remains extended. This preferred embodiment, depicted in FIGS. 3a and 3b, allows the shortest possible envelope size, while maintaining visibility of spine label 314.

Also contemplated within the scope of the present invention is envelope 100 sized to accept case liner 312 with both spine labels 310 and 314 unfolded. However, this embodiment results in a slightly larger envelope size.

Figure 3B:
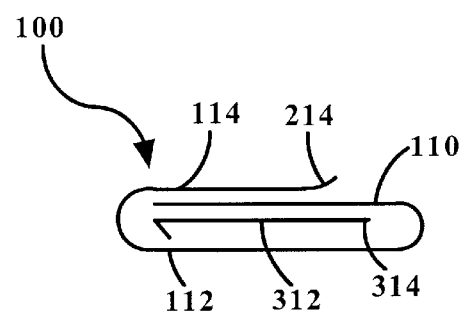

FIG. 3b shows region 110 inserted between regions 114 and 112. In this position, case liner 312 is entirely protected but still visible. Removal of case liner 312 is accomplished by reversing the above steps detailing its insertion. And, as before, lobes 118 and flaps 116 facilitate the opening of envelope 100 and removal of liner 312.

Figure 4:
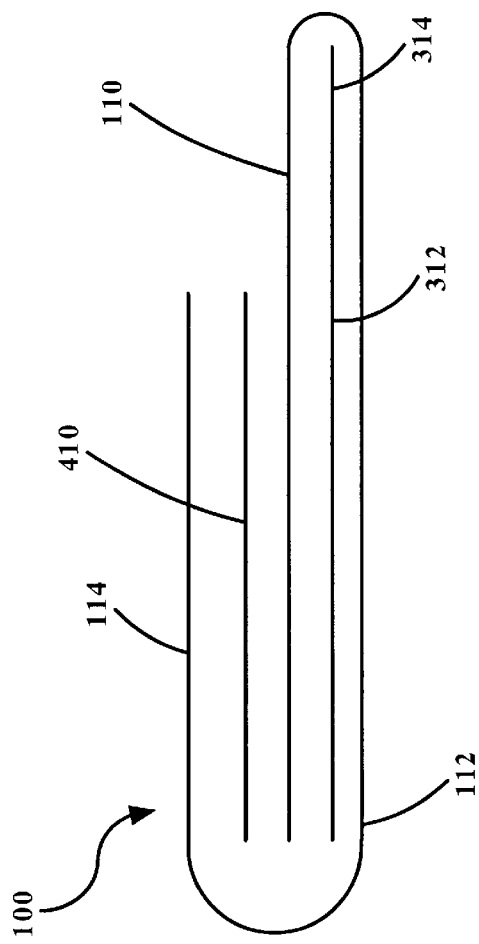
FIG. 4 illustrates a side view of literature and a compact disc inserted within the envelope of the present invention.

FIG. 4 illustrates where compact disc 410 is positioned in relation to the other elements of envelope 100. During the insertion of disc 410 the shape of lobes 118 (not shown in FIG. 4) and the expansion allowed by flaps 116 (not shown in FIG. 4) allow disc 410 to be easily positioned in-between regions 114 and 110 and removed therefrom.

Disc 410 is preferably inserted with its recording side adjacent region 110 and its label side adjacent region 114. This orientation provides a clear view of the disc's face. This preferred orientation allows a means of protection to be incorporated in or on the surface of region 110 which is adjacent to the recording surface of disc 410 (see FIGS. 1d and 1e). The purpose of the treatment is to prevent, or at least minimize, scratching and damage to the recording side of disc 410.

Known treatment methods include the use of a thin felt-like material composed of non-woven fibers. Also used is a thin plastic film penetrated by a pattern of closely space semicircular cuts. A functionally equivalent, but innovative, method also includes an applied thin layer of open-cell plastic or elastomer foam. Another innovative method includes a pattern of pricks which may be actual holes or merely raised pimples applied from the back side of region 110. Producing these holes will raise on the surface of region 110 adjacent disc 410 open-top cones having a height of approximately 0.010 inches, each with a very thin rim. These cones will not scratch disc 410 as the envelope plastic is softer than the surface of disk; nor are their tips likely to hold and drag grit across 410. A further and most useful attribute of the pin prick protection is that it maintains the transparency of the plastic so that the case liner may be read.

Figure 5:
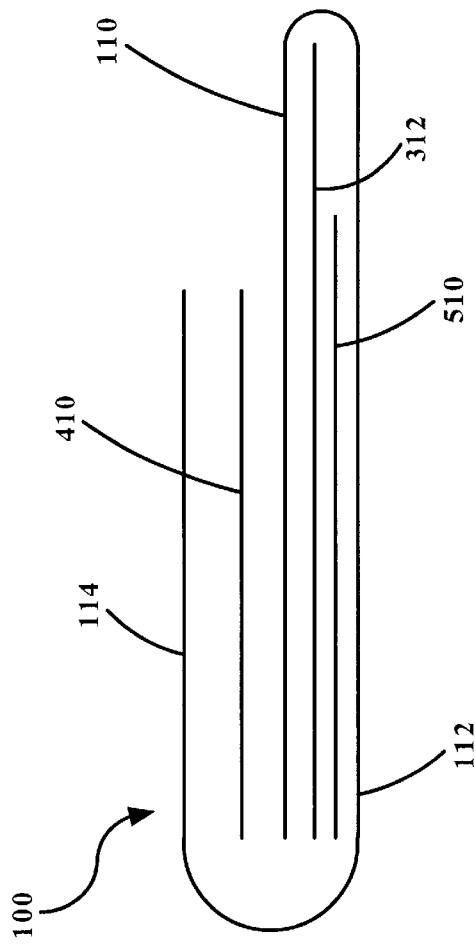
FIG. 5 illustrates a side view of a case liner, liner notes and a compact disc inserted within the envelope of the present invention.

FIG. 5 introduces a preferred location for liner notes 510 between case liner 312 and region 112. In this position, liner notes are visible from the rear of envelope 100 through region 112. The envelope of the present invention is appropriate for a wide variety of applications. Media duplicators and providers require inexpensive, easy-to-handle, and small-sized media holders to store, display to and ship compact discs. As individual, stand-alone envelopes, the present invention more than fulfills these requirements.

Figure 6A:
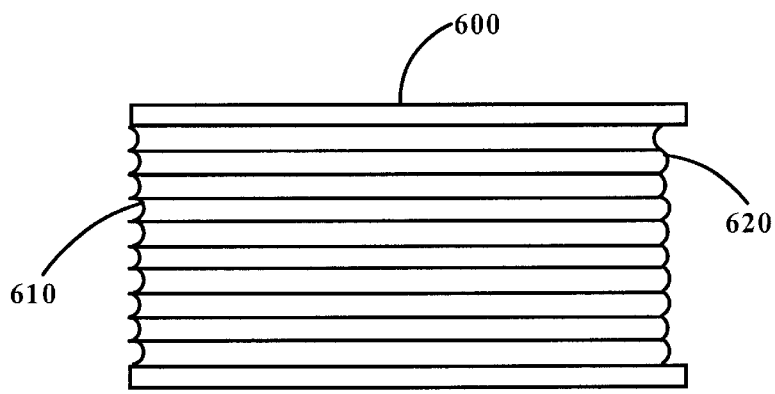
FIGS. 6a and 6b illustrate a collapsed and expanded depiction, respectively, of a binder incorporating multiple envelopes of the present invention.
Figure 6B:
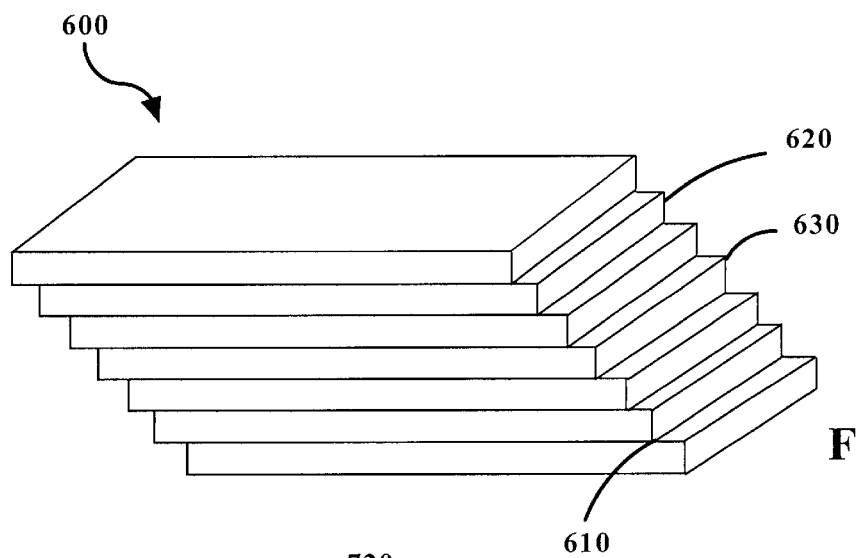

However, FIGS. 6a and 6b illustrate a preferred embodiment which accentuates many benefits of the present invention. In this embodiment, a plurality of envelopes 620 are bound together in book-type holder 600. FIG. 6a depicts holder 600 with binding 610 collapsed. FIG. 6b, on the other hand, depicts holder 600 with binding 610 expanded. In the expanded arrangement, ends 630 of each envelope 620 are each exposed for approximately ¼ inch. Therefore, because spine labels occupy regions 630, holder 600 displays, when open, a visible identity of all envelopes 620 simultaneously. Even when holder 600 is only partially open, portion 630 allows "thumbing-through" of the envelope's spine labels to quickly identify a disc of interest.

Figure 7:
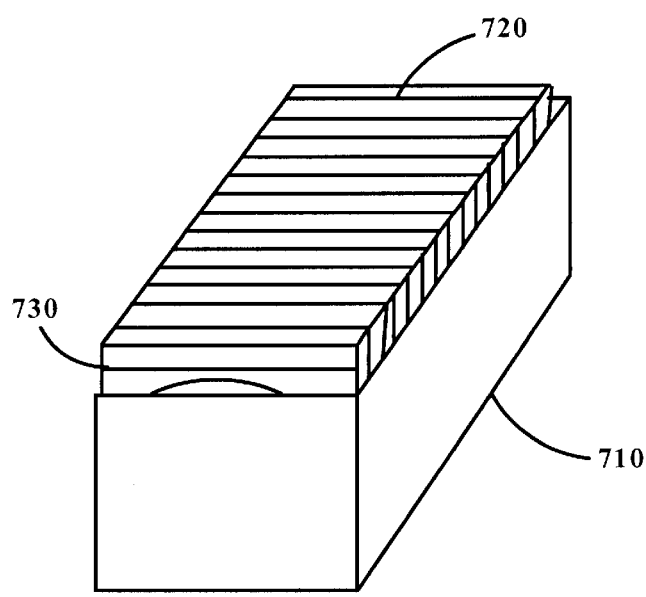
FIG. 7 illustrates a card catalog storage device incorporating a plurality of the envelopes of the present invention.

FIG. 7 illustrates the use of envelopes 720 in a card-type catalog 710. In this arrangement, spine labels 730 are protected and still visible. Because of the flexibility of the top regions of envelopes 720 "thumbing-through" spine labels 730 provides nearly simultaneous access to all the envelope labels and simplifies locating a disc of interest.

The steps associated with the method of the present invention are outlined below:

a. User removes the disc or other recording media and associated literature from its original packaging.
b. User holds the case liner in one hand.
c. Holding the recording media in the other hand, the user swings the envelope open and insert the liner.
d. User then holds the envelope open, and inserts the liner with spine label viewable into the envelope fold with their thumbs.
e. User slips the flap behind the lobes and slides it down to closed position.
f. User inserts the disk above the flap.
g. Optionally in step b, user centers the liner notes behind the case liner and holds them both in one hand.

In this configuration, the user can repeatedly remove/insert the recording media without opening the envelope and without disturbing the literature as the envelope comprises two pockets, one for the literature and one for the disc (separated by the flap).

Thus, the present invention provides for a recording media and literature holder wherein the speed of filing disk and literature and speed of recognition and recovery is greatly increased-as both these operations require opening and closing the envelope via a three finger operation. The index finger of one hand slides the flap while two fingers of the other hand hold down the envelope. The notch cut into the tip of the envelope's flap reduces this to a simpler faster operation since a single finger holds down the envelope.

CONCLUSION

A system and method has been shown in the above embodiments for the effective implementation of a transparent compact disc envelope which protects both a disc and its accompanying literature. Furthermore the envelope provides a readily visible identity using the supplied literature. While various preferred embodiments have been shown and described, it will be understood that there is no intent to limit the invention by such disclosure, but rather, it is intended to cover all modifications and alternate constructions falling within the spirit and scope of the invention as defined in the appended claims. For example, the present invention should not be limited by size, materials, connection methods, textures, media, or manufacturing methods.

What is claimed is:

1. A two pocket plastic envelope for holding disk media and literature comprising:
   a single-piece transparent flexible sheet, said sheet comprising:
   a first substantially planar closure flap region;
   a second substantially planar region, said second region connected to said first substantially planar closure flap region through a first horizontal fold, said first region substantially equal in size to said second region;
   a third substantially planar region, said third region comprising a plurality of distal lobes and a plurality of parallel side flaps, said plurality of side flaps comprising a first flap extending along a first edge of said third region and a second flap extending along a second opposite edge of said third region, each of said flaps further comprising a first vertical fold proximate each of said first and second edges and a second vertical fold extended beyond said first and second edges, said third region connected to said second region through a second horizontal fold;
   said envelope formed by said second and third planar regions operatively connected via said plurality of said side flaps, forming a first pocket to hold said literature, and said first planar region folding over said second planar region, and below said third planar region thereby forming a second pocket to hold said recording media, and
   said second planar region extending beyond said third planar region in length, said first pocket fully enclosed and said second pocket accessible externally.

2. An apparatus for holding recording media and literature comprising: a first sheet of flexible transparent material, said first sheet surface used as a closure flap;
   a second substantially rectangular sheet of flexible transparent material, said second substantially rectangular sheet secured to said first substantially rectangular sheet along one edge;
   a third sheet of flexible transparent material, said third sheet of flexible transparent material comprising a plurality of side flaps, two lobes and a v-shaped cutout section, said third sheet secured to said second substantially rectangular sheet along one edge, and operatively connected thereto via said plurality of said flaps, thereby forming an envelope, and
   said first sheet fitting within said envelope forming a first and second pocket, said two lobes and said v-shaped cutout section to provide easy insertion/removal of said recording media and said second pocket retaining a height ratio relative to the height of said first pocket of approximately 5.75:4.75 thereby forming a portion of said second pocket which extends beyond said first pocket.

3. An apparatus for holding recording media and literature, as per claim 2, wherein a plurality of said envelopes are secured together to form a library.

4. An apparatus for holding recording media and literature, as per claim 2, wherein said side flaps comprise a plurality of folds to reduce potential binding of said literature during entry/removal thereof.

5. A method for transferring recording compact discs and associated literature to a transparent flexible holder, said holder comprising a single-piece transparent flexible sheet comprising a first substantially planar closure flap region, a second substantially planar region, said second region connected to said first substantially planar region through a first fold, and a third substantially planar region, said third region comprising a plurality of side flaps, said third region connected to said second region through a second fold, said method comprising:
   placing said literature substantially within a pocket formed by connecting said third region to said second region using said plurality of side flaps, thereby encapsulating said literature in said first pocket;
   placing said first region closure flap within said pocket forming a second open pocket, said closure flap extending substantially a length of said second region and separating said first pocket with said literature from said second open pocket;
   placing said media in said second open pocket, and
   wherein said second planar region extends beyond said third planar region in length so that a portion of said literature remains visible.

6. A flexible, transparent envelope for holding electronic recording media and associated literature comprising:
   a single-piece elongated transparent sheet folded to form a back surface, a front surface and a flap;
   said back surface having a substantially rectangular shape further comprising a top edge, a bottom edge, and a first and second side edge;
   said front surface comprising a bottom edge, a curved top edge, and a first and second side edge;
   each of said front surface's side edges further comprising a flap extending along each said side edges;
   said front surface and said back surface sealed along said bottom edges, and operatively connected by said flaps along said side edges to form an envelope with an opening formed by said front and back surface's top edges;
   said flap having a top edge, a first and second side edge, and a curved bottom edge;
   said flap's top edge connected to said back surface's top edge, wherein said flap separates said envelope into a first literature receiving pocket and a second open recording media pocket;
   said first literature receiving pocket formed between said flap and said back surface;
   said second open recording media pocket formed between said flap and said front surface, and
   said second open recording media pocket retaining a height ratio relative to the height of said first literature receiving pocket of approximately 5.75:4.75 to thereby form a portion of said first pocket which extends beyond said second pocket.

* * * * *